United States Patent [19]
Hochstrasser

[11] 3,960,727
[45] June 1, 1976

[54] APPARATUS AND METHOD FOR ISOLATING SOLUBLE BLOOD COMPONENTS

[76] Inventor: Harry T. Hochstrasser, 47 Summit Drive, Hastings-on-Hudson, N.Y. 10706

[22] Filed: Aug. 9, 1974

[21] Appl. No.: 496,030

[52] U.S. Cl. ............................ 210/78; 210/117; 210/359; 210/DIG. 23
[51] Int. Cl.² ........................................ B01D 33/00
[58] Field of Search .............. 23/230 B, 258.5, 259, 23/292; 128/214 R, 218 M, 272; 210/83, 84, 109, 131, 359, 514–518, DIG. 23, DIG. 24, 78, 117; 233/1 A, 1 R, 26

[56] References Cited
UNITED STATES PATENTS

| | | | |
|---|---|---|---|
| 3,481,477 | 12/1969 | Farr | 210/DIG. 23 |
| 3,508,653 | 4/1970 | Coleman | 210/DIG. 23 |
| 3,512,940 | 5/1970 | Shapiro | 210/DIG. 23 |
| 3,661,265 | 5/1972 | Greenspan | 210/359 |
| 3,761,408 | 9/1973 | Lee | 210/DIG. 23 |
| 3,782,548 | 1/1974 | Bowen | 210/518 X |
| 3,814,248 | 6/1974 | Lawhead | 210/83 |
| 3,814,258 | 6/1974 | Ayres | 210/DIG. 23 |
| 3,832,141 | 8/1974 | Haldopoulos | 210/DIG. 23 |

*Primary Examiner*—Charles N. Hart
*Assistant Examiner*—Robert H. Spitzer
*Attorney, Agent, or Firm*—Kane, Dalsimer, Kane, Sullivan and Kurucz

[57] ABSTRACT

A method is disclosed for isolating blood serum from clotted whole blood and for isolating blood plasma from mixtures of whole blood with anti-coagulants. The method comprises partially sinking an apparatus of the invention in the appropriate blood specimen, conveniently with the assistance of centrifugation.

The apparatus of the invention comprises a hollow elongate body open at both ends. One end is partially closed with a filter member which prevents the passage of solid phase components of clotted whole blood and solid phase components of mixtures of blood with anti-coagulants but allows passage of blood serum or blood plasma.

11 Claims, 12 Drawing Figures

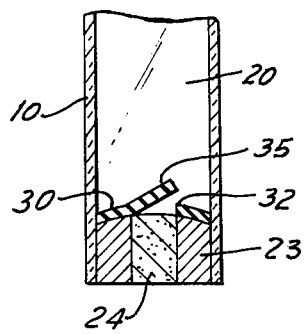
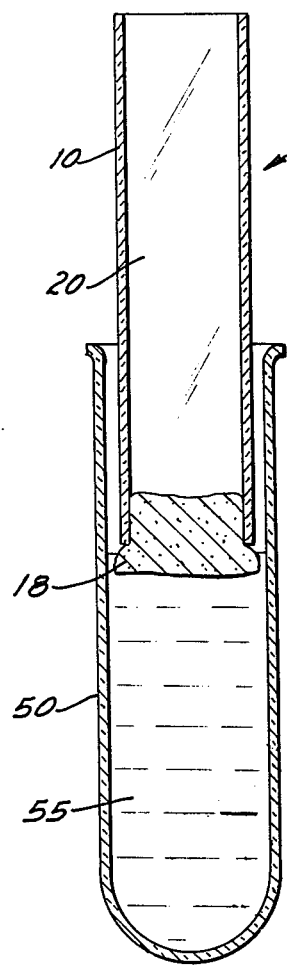
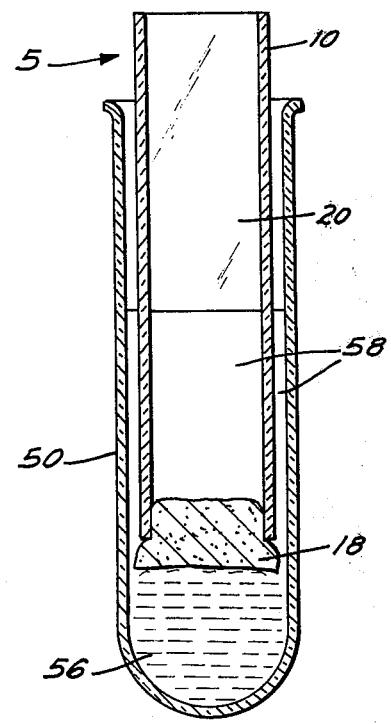

APPARATUS AND METHOD FOR ISOLATING SOLUBLE BLOOD COMPONENTS

BACKGROUND OF THE INVENTION

1. Field of the Invention

The invention concerns methods and apparatus for isolating blood serum from coagulated whole blood and blood plasma from mixtures of whole blood with anti-coagulants.

2. Description of the Prior Art

Prior hereto the most widely employed method of separating the liquid phase components from the solid phase components of a blood mixture has comprised centrifugation of the mixture. The serum or plasma is generally then isolated from the solid portion by pipette or decantation techniques. In general, this method does not entirely separate all of the solid particulate matter from the desired serum or plasma. For example, minute particles or shreds of fibrin having a specific gravity approximating the specific gravity of blood serum or blood plasma may not be separated. When the serum is to be subjected to a diagnostic analysis with, for example, an automated electronic analyzer it is important to employ a particulate-free specimen. Fibrin fibers are often the cause of analyzer malfunctions when they clog conduits or orifices in the analyzer.

Filtration has been employed previously to remove solid particles such as minute fibers of fibrin not readily separated by centrifugation. Illustrative of the prior art blood component filtration devices are those described in U.S. Pat. Nos. 3,481,477; 3,512,940 and 3,693,804. Although such filtration devices do isolate the desired blood serum or blood plasma from even microscopic solid particulate matter, they are relatively expensive to construct, requiring extremely close tolerances and seals for operation. They have not been heretofore as widely accepted commercially as the need suggests, because of their cost and difficulty to manufacture. In additon, the prior art filtration devices such as those described in the above patents operate in part by exerting force or pressure upon the blood mixture to be separated. If too great a force is imposed upon the blood mixture, there is a danger that the filtrate will pass through the filter with sufficient velocity to force small particles of solid material through the filter, particularly a resilient filter. The velocity of the filtrate leaving the filter member may also be sufficient to "spray" the filtrate out of the collector device. Furthermore, the necessary force must be applied manually, and only one or two specimens may be process simultaneously, which is an inefficient use of labor. The filtration and isolation procedure with the prior art devices are also generally carried out following separation of the blood components by centrifugation, thereby requiring two distinct steps which consequent extension of time required for total serum preparation.

In contrast, the method of my invention is relatively simple and is activated by readily available and self-limiting gravitational forces. Thus, it enables one to carry out separation, filtration and isolation of the desired blood serum or blood plasma in one convenient centrifugation step. The process is readily applied to a large number of specimens simultaneously, and the centrifugation step is the same operation widely employed in separating serum from clotted blood and cells from mixtures of blood with anti-coagulants. Likewise, the apparatus of my invention is extremely simple in construction and is readily manufactured at low cost since it does not require close dimensional tolerances or seals. The method and apparatus of my invention are particularly useful in the separation of blood serum from clotted whole blood, removing minute particles such as fibrin fibers from their association with the serum isolate.

BRIEF DESCRIPTION OF THE DRAWINGS

FIG. 7 is an enlarged fragmentary cross-sectional view of the lower portion of an apparatus constructed according to the invention showing another alternate filter member embodiment.

FIG. 8 is a cross-sectional side view of a conventional vessel containing a blood mixture. In place at the surface of the blood specimen is an apparatus of the invention as shown in FIG. 1.

FIG. 9 is a cross-sectional side view of the apparatus and vessel as shown in FIG. 8 but following sinking of the apparatus of the invention shown in FIG. 1 into the blood mixture.

SUMMARY OF THE INVENTION

The invention comprises an apparatus for isolating the soluble components from the insoluble components of blood mixtures selected from coagulated whole blood and mixtures of whole blood with anti-coagulants, which comprises: an elongate body defining a central bore which has an upper portion and a lower portion; said body having a first end which is open and communicates freely between the exterior and the upper portion of said bore, and a second end which is open and communicates between the exterior and the lower portion of said bore; a filter member located adjacent to said second end and being interposed between said body exterior and the lower portion of said bore, said filter member having pore sizes which permit the passage of soluble blood components but prevent passage of insoluble blood components; said apparatus having a specific gravity such that it will sink in said soluble components but will not sink in said insoluble components. As will be apparent to anyone familiar with the art, a particular specific gravity required will vary for each level of hematocrit. It is a feature of the present invention that the apparatus may be designed in regard to flotation effects so as to accommodate the lowest hematocrits, while simultaneously possessing a mechanical safeguard against undesirable penetration into the clot or cells in the case of all higher hematocrits.

The invention also comprises a method of isolating the soluble components from the insoluble components of a blood mixture selected from coagulated whole blood and mixtures of whole blood with anti-coagulants which comprises sinking in said blood mixture an apparatus of the invention as described above. The sinking action is conveniently accelerated by the application of a centrifugal force field to the combination of the apparatus and the specimen in the vessel.

The term "soluble components" or "soluble portion" as used herein means that portion of a specimen of blood which is liquid. The term "insoluble components" or "insoluble portion" as used herein means solid or semisolid particulate matter. In general, the solid or semi-solid particulate matter referred to herein has an effective spherical diameter greater than about 50 microns but smaller diameter particulate matter may also be separated by the method of the invention.

The term "coagulated blood" is used herein to mean blood which has been allowed to clot.

The term "blood mixtures" as employed herein means coagulated or clotted whole blood or a mixture of whole blood with an anti-coagulant compound such as, for example, heparin, potassium oxalate and the like.

DETAILED DESCRIPTION OF THE INVENTION

Figure 1:
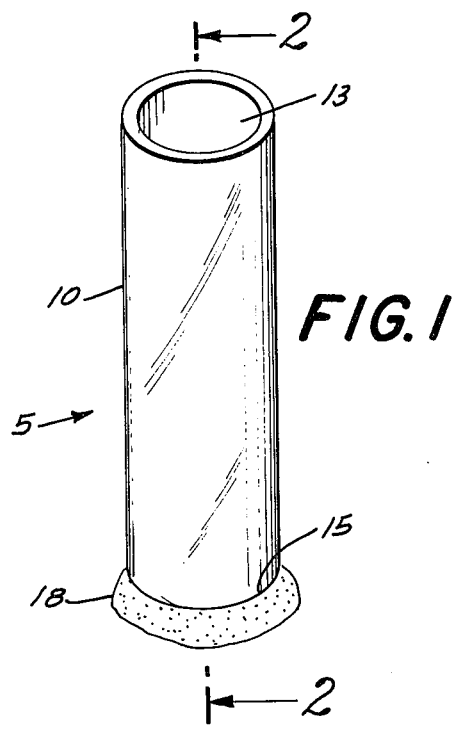
FIG. 1 is an overall isometric view of an apparatus constructed in accordance with the invention.

The apparatus of my invention is readily described by referring to the specific embodiments illustrated in the drawings. Referring first to FIG. 1, there is seen apparatus 5 having an elongate cylindrical body comprising tube 10 having an open upper end 13 and a lower end 15 which is partially closed with filter member 18. The shape of the apparatus 5 is not critical and may be cylindrical as illustrated here, rectangular or any other convenient shape so long as it is an elongate body. The tube 10 may be constructed of synthetic plastics such as for example, polyacrylate, polyvinyl, polystyrene or any other conventionally employed material which has the appropriate density to meet the specific gravity requirements of the apparatus as hereinafter described and which is inert to blood and its components, and to commonly used anticoagulent materials at the usual concentrations. By inert I mean that the material used does not react with or in any way alter the physical properties of blood or blood components, as detectable by methods commonly used to measure these in the clinical laboratory; and to the extent that medical usefulness of results is impaired.

Filter 18 may be constructed of any conventional filter material inert to blood as defined above for the body tube. The filter material will have pores which permit the passage of soluble blood components but prevent passage of insoluble blood components as previously defined, through the filter. In general, the pores deny passage of solid and semi-solid particulate material having a spherical diameter of greater than about 50 microns. Such filter materials and methods of their preparation are well known and are illustrated by porous plastic materials such as porous polyethylene, porous polyurethane, porous tetrafluoroethylene and the like; porous ceramic material, sintered glass, glass wool, asbestos, diatomaceous silica and the like. Preferred as a filter member is an open cell polyurethane foam having the above described porosity. This preference is based not only upon the suitability as a filter element, but primarily on its suitability as a material whose penetration into the layer of clot or cells is mechanically impeded, even under the force of centrifugation as commonly practised in clinical laboratories for the separation of clot or cells.

Most preferred is a relatively dense filter member, i.e., one having pore sizes on the order of circa 50 microns or less, in at least one element layer. Such relatively dense filter members provide a good barrier between the isolated serum or plasma and the insoluble blood components. This is advantageous in preventing diffusion of serum or plasma constituents back through the filter member in the event that the apparatus of the invention is not immediately removed from contact with the insoluble components, following separation.

Figure 2:
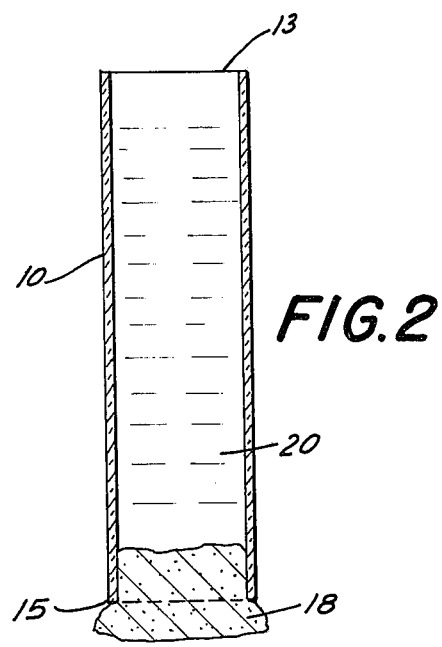
FIG. 2 is a vertical cross-sectional view taken along lines 2—2 of FIG. 1.
Figure 3:
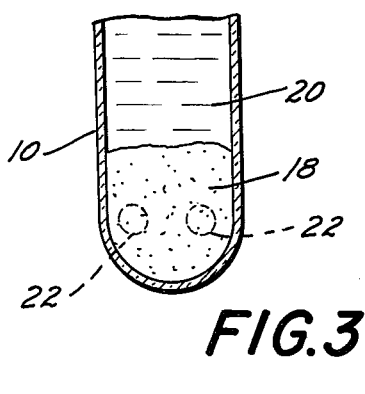
FIG. 3 is an enlarged fragmentary view of the lower end of an apparatus constructed in accordance with the invention, showing an alternate embodiment in a partially closed end adjacent to the filter member.
Figure 4:
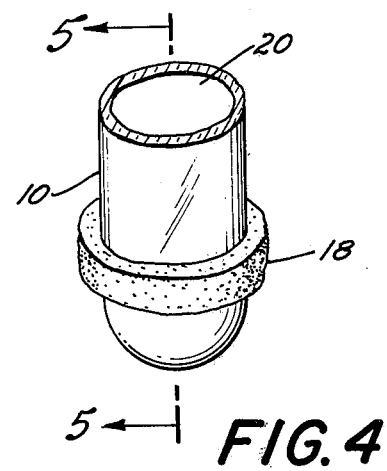
FIG. 4 shows an end as illustrated in FIG. 3 but with an alternate placement of the filter member.
Figure 5:
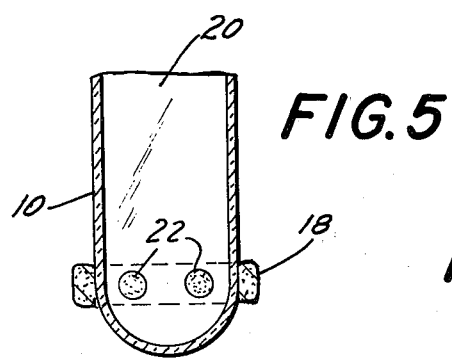
FIG. 5 is a cross-sectional view along lines 5—5 of FIG. 4.
Figure 6:
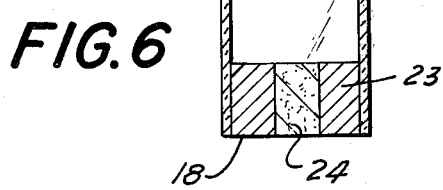
FIG. 6 is an enlarged fragmentary cross-sectional view of the lower portion of an apparatus of the invention showing an alternate filter member embodiment.

Referring now to FIG. 2, a cross-sectional view taken along lines 2—2 of FIG. 1, it is readily observed that the cylindrical body 10 defines a central bore or passageway communicating between open end 13 and partially open end 15 having filter 18 interposed between the two openings. Filter 18 is held in place by friction and forms a base for a collecting chamber 20 which is defined above it. Although the holding of filter member 18 in place by friction against the tube wall 10 as illustrated in FIGS. 1 and 2 is a preferred embodiment, filter 18 may be retained in position by any convenient alternate means. For example, FIG. 3 is a fragmentary view of the lower portion of an apparatus of the invention 5 and illustrates an alternate embodiment for holding filter 18 in place. In this embodiment, the end opening 15 is partially closed having a multiplicity of small openings 22 which communicate with the tube 10 exterior. Filter 18 is retained completely within the lower portion of the bore of tube 10, adjacent to and covering the openings 22. FIG. 4 is a view of the apparatus 5 as shown in FIG. 3, but the filter 18 is in the shape of a sleeve and is positioned on the outside of the tube 10, covering multiple openings 22. FIG. 5 is a cross-sectional view of the apparatus 5 of FIG. 4 through lines 5—5 and shows the openings 22 underlying filter 18. Other forms, types and shapes of filters 18 may be used. For example, FIG. 6 shows a cross-sectional view of an alternate type of filter emplaced in tube 10. Here, filter 18 is a composite of non-porous material 23 surrounding a central core of, for example, porous sintered polyethylene 24. In FIG. 7 another alternate type of filter 18 is shown in cross section, emplaced in tube 10. Here, a filter 18 as shown in FIG. 6 has a concave surface at the interface with collection chamber 20. Over the concave surface there is partially laminated a layer of flexible impervious plastic 30 of low density which is severed 32 to form a flap valve portion 35. While the apparatus sinks, valve 35 swings open to allow ingress of blood serum or plasma into chamber 20. Following maximum submergence valve 35 closes to seal the isolated serum or plasma within chamber 20. FIG. 7 shows the valve 35 in an open position. Valve type filter members such as those illustrated by FIG. 7 are particularly advantageous in preventing diffusion of serum or plasma constituents back through the filter member.

The apparatus of the invention as illustrated in FIGS. 1–6 above has an overall body density giving a specific gravity such that it will sink in serum or plasma to a level at which it just contacts the top of the clot or packed cells, but not lower. In general, the apparatus of the invention will have an overall specific gravity of between about 0.3 and 1.3 and preferably of about 0.60.

It will be apparent that construction of the apparatus of the invention will not be limited to the few possibilities given above as examples. For instance, in meeting the double requirements, of (a) excluding small fibrin particles and minimizing diffusion of soluble blood components by means of a dense filter and (b) providing a spongy network that interlocks in the network of clot and/or cell wall fibers I have constructed an apparatus within the scope of the invention having two filter elements, i.e. a top-most filtering member of porous sintered polyethylene, and a bottom-most expanded sponge element of open cell polyurethane foam. Although both elements of the combined filter members function as filters, it will be apparent that their primary functions are slightly different.

An apparatus of the invention having the proper specific gravity as described above will descend in the blood mixture to a point in said blood mixture wherein the lower edge of the apparatus has passed through substantially all of the liquid portion of the blood mixture and just contacts the upper level of the separated solids portion of the blood mixture, but does not penetrate the solids portion to any significant degree. The separation of the blood mixture into an upper liquid portion and a lower solid portion occurs through the effect of gravitational forces upon the two phases which have appropriately differing specific gravities.

The method of the invention is readily carried out by allowing the apparatus of the invention to sink in the blood mixture from which the soluble components are to be isolated. In the case of blood specimens treated with an anti-coagulant, the apparatus of the invention may be allowed to sink in the mixture at any convenient point of time. However, in the case of untreated whole blood, one must wait until coagulation has occurred and clot formation is complete. Those skilled in the art recognize when clot formation is essentially complete (usually within an hour at ambient temperatures). Although not necessary to the method of the invention, the soluble and insoluble components of the blood mixture may be first separated from each other by centrifugation prior to isolation by the method of the invention. To illustrate the method of the invention, there is shown in the cross-sectional view of FIG. 8 an apparatus 5 as illustrated in FIG. 1, emplaced upon the surface of blood mixture 55 held in container 50. The apparatus is stood substantially vertically with the filter member 18 contacting the blood mixture 55. An apparatus of the invention having the proper specific gravity as previously described and so placed will sink in blood mixture 55 as the soluble blood components leak through the filter 18 and into chamber 20. Descent of the apparatus 5 is terminated (and consequently further isolation of serum or plasma) when the solid blood components have coalesced beneath the descending apparatus 5 so as to form a support for the weight of said apparatus 5. The sinking process is conveniently accelerated by subjecting the entire assembly to centrifugation.

Referring now to FIG. 9, there are seen the elements of FIG. 8 but following the sinking of apparatus 5 in blood mixture 55. The apparatus 5 has descended so that its weight is now supported by solid blood components 56 and the major portion of soluble components 58 are now within chamber 20. At this point, filter 18 functions as a diffusion barrier between solid matter 56 and soluble components 58. The desired soluble components 58 within collecting chamber 20 may now be removed by pipette or decantation for transfer to a suitable analysis vessel or the entire assembly may be used as the analysis vessel thereby retaining identity.

It is helpful in appreciating and understanding the method of the invention to consider that the semi-solid network of fibrin and cell bodies, in the case of whole blood, and of centrifugally impacted cell bodies in the case of mixtures of blood with anti-coagulants, can be readily penetrated by a hard smooth surfaced object such as a glass or plastic rod or a cylinder closed at the lower end by means of a similarly hard and smooth element, acting under an appropriately applied force. Using a preferred form of the apparatus of the invention, however, as shown in FIGS. 1, 2, 8 and 9, I have discovered that penetration of the apparatus into the layer of cells alone, or cells plus fibrin (56 in FIG. 9) is greatly impeded. The explanation for this observation resides in the fact that the rough, fibrous, spongy, three-dimensional network of polyurethane foam cannot readily penetrate the similarly fibrous, spongy, three-dimensional network of fibrin and/or impacted blood cell bodies. In fact, avoidance of penetration of the fibrous, spongy, three-dimensional network of fibrin and/or impacted blood cell bodies may be advantageously assisted by providing the lower extremity of the apparatus of the invention, i.e. that portion which is likely to contact the fibrin or impacted blood cell bodies, with a surface comprising a network of fibrils, preferably coiled twisted, roughened, and/or possessing tiny hooks or otherwise constituted so as to offer high resistance against any tendency for said extremity to penetrate the layer of clotted or otherwise impacted blood cells. One method of providing such a surface is to attach a porous velvet type of fabric to the lower end of the filter member. Representative of porous velvet type fabrics particularly advantageous for this purpose is the hook or male section of the well known Velcro nylon tape fastener (see U.S. Pat. No. 2,717,437). It is also helpful to realize that the solid layer (56 in FIG. 9) does not support the full weight of the apparatus, but only that fraction of the full weight which is not supported by the bouyant force of the serum displaced by the walls of cylinder 10 and the solid fibers constituting the filter element 18. Furthermore, in a preferred form of the apparatus of the invention, the overall specific gravity of the apparatus is such that it is actually floating in serum or plasma at the level shown in FIG. 9, at a predetermined hematocrit value, hence the weight fraction to be supported by the cell layer is zero in the case of blood having that hematocrit value. For all higher values of hematocrit, the cell-clot layer is required to support only that fraction of the tube weight represented by the weight of serum or plasma that would have been displaced if no clot or cells were present and the apparatus was thus free to seek its equilibrium flotation depth based solely on bouyance considerations. The methods and materials used for the construction of preferred forms are known in the art, but the configurations claimed here are novel.

It will be noted from FIGS. 8 and 9 that the apparatus of the invention 5 fits loosely within the bore of the container tube 50.

The apparatus of the invention may be constructed according to any convenient dimensions provided it has a circumference which permits it to fit loosely within the bore of the tube employed to hold the blood mixture to be separated. By fitting "loosely" I mean the apparatus of the invention may move freely within the bore of the blood mixture containing tube, without impinging upon the interior walls of such tube. Preferably, the apparatus of the invention will have a diameter of about two to five percent less than the diameter of the blood mixture containing tube. When the filter member of the apparatus of the invention is the preferred plastic foam such as a polyurethane foam, it may swell upon filling of the filter interstices with serum or plasma. When a portion of such a swollen foam filter protrudes from the tubular body of the apparatus of the invention as shown, for example in the embodiment of FIG. 1, the diameter of that portion is disregarded in the above context, since such swollen semi-solid filters are insufficiently rigid to have any significant effect on the freedom of movement of the apparatus within the collection vessel. In such a case, the diameter of the rigid wall cylinder 10 is the pertinent dimension.

In a preferred embodiment, an apparatus of the invention having a flexible plastic foam filter member is constructed so that the protruding portion of the swollen filter member 18 as shown in the embodiment of FIG. 1, just touches the inner wall of the blood mixture container 50 but does not impinge thereon sufficiently to cause a significant frictional force between filter member 18 and the inner wall of container 50. The resultant apparatus 5 of the invention following submergence according to the method of the invention, will maintain its horizontal position within the container 50 for convenience in decanting the isolated solubles 58 from apparatus 5.

A convenient length for the apparatus of the invention as illustrated by apparatus 5 is one sufficient to allow the tube 10 to protrude out of the container 50 for easy manual removal as shown in FIG. 9.

As mentioned above, the method of the invention is advantageously speeded up with the assistance of centrifugation. Thus, referring again for illustration to FIGS. 8 and 9, the blood container 50 is advantageously a centrifuge tube, and after placement of apparatus 5 within vessel 50 the entire assembly may be centrifuged preferably at 500 to 2,000 g. for from about 2 to about 10 minutes and most preferably at about 500 g. for about 10 minutes. The effect of centrifuging does not in any way alter the operation of the apparatus of the invention or of the results obtained. The sole effect of centrifuging is to accelerate the gravitational force on the apparatus of the invention, blood mixture and containing vessel. This accelerates the rate of sinking of the apparatus of the invention from a period of hours to several minutes.

Figure 10:
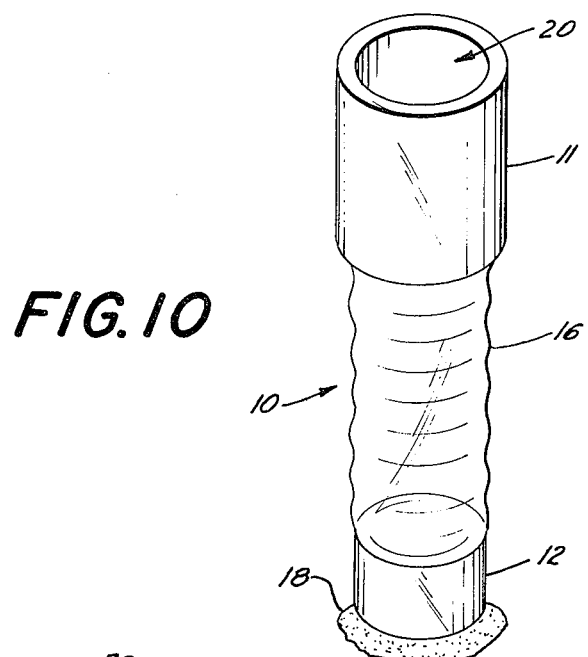
FIG. 10 is an isometric overall view of an alternate embodiment apparatus of the invention.

An alternate embodiment of the apparatus of the invention which is particularly advantageous for use in the method of the invention, assisted by centrifugation, is shown in FIG. 10. The essential feature of this preferred embodiment is the construction of a collapsible tube 10 defining the collection chamber 20. Illustrative of a collapsible tube 10 is one which comprises a relatively inflexible upper tube member 11, a relatively inflexible lower tube member 12 holding filter 18 and an interposed foldable member 16 joining upper tube 11 and lower tube 12 members. The tube members 11 and 12 may be fabricated of any of the previously mentioned materials for construction of a tube 10. The collapsible member 16 of the tube joining tube members 11 and 12 may be any tubular, flexible and foldable material inert and impervious to blood mixtures. Illustrative of materials from which foldable member 16 may be fabricated are polyethylene film, polypropylene film and the like. The folding member 16 is adhesively adhered to upper 11 and lower 12 tube members. Prior to use, the member 16 of the preferred apparatus as shown in FIG. 10 is folded and held in the central bore 20 of upper tube member 11. Lower tube member 12 has an outside diameter approximating the inside diameter of upper tube member 11 so that with foldable tube member 16 folded within upper tube member 11, lower tube member 12 and filter 18 are inserted and held by friction within the lower opening of upper tube member 11. The method of using the collapsible apparatus of FIG. 10 is seen by referring to FIGS. 11 and 12.

Figure 11:
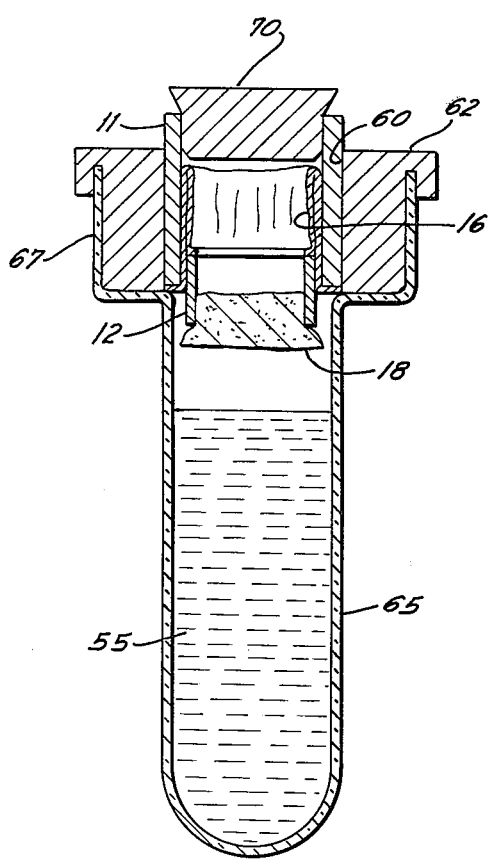
FIG. 11 is a cross-sectional view of an apparatus as shown in FIG. 10, emplaced in a centrifuge tube prior to sinking in a blood mixture with the assistance of centrifugation.
Figure 12:
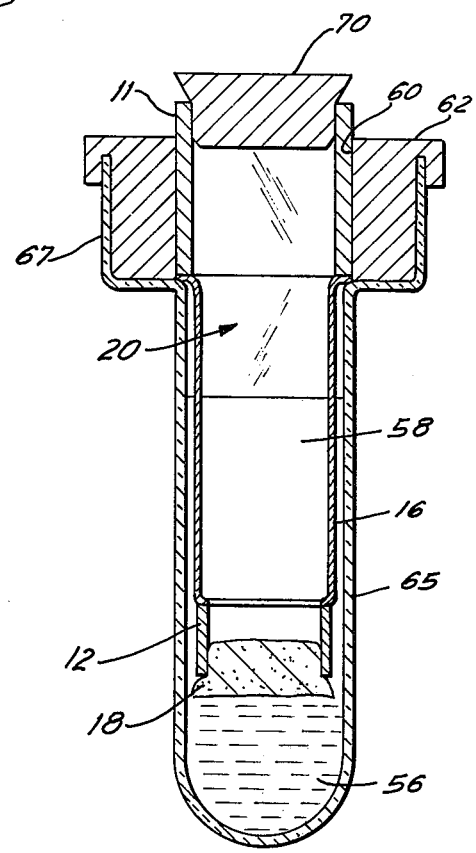
FIG. 12 is a view as shown in FIG. 11 but following centrifugation.

In FIG. 11, a collapsible apparatus of FIG. 10 is seen mounted within a central bore 60 of an elastomeric cap 62 covering centrifuge tube 65. The centrifuge tube 65 is constructed having a wide flange 67 at its open end and is shown holding a blood mixture 55. The collapsible tube of FIG. 10 is shown in its collapsed position and is capped with a plug 70. Upon centrifugation, lower tube member 12 disengages from upper tube member 11 and descends through blood mixture 55, pulling the folded tube member 16 behind it. FIG. 12 shows the apparatus and elements of FIG. 11 but following centrifugation. As shown, the collapsible tube wall member 16 is now extended fully to form collector chamber 20 which holds the soluble blood components 58. The soluble components 58 are free of solid particles having passed through filter member 18 to enter collector chamber 20. The sunken member 12 with filter 18 assembly comprising part of the preferred apparatus of the invention is supported on the solid blood components 56.

In the preferred collapsible apparatus of the invention as illustrated in FIG. 10 the specific gravity limitations hereinbefore described need apply only to the components of the apparatus which descend through the blood mixture, i.e. flexible member 16, lower tube member 12 and filter member 18 together must have the previously described specific gravity. The preferred embodiment comprising a collapsible tube is particularly advantageous for storage prior to use, presenting a compact and easily packed unit. Following use, the collapsible tube is sufficiently stable for long term storage of the separated blood component, particularly when an embodiment combining the features of that shown in FIG. 12 and the slit-valve of FIG. 7 is employed.

I claim:
1. An assembly for isolating the soluble components from the insoluble components of blood mixtures selected from coagulated whole blood and mixtures of whole blood with anti-coagulants which comprises:
 i. a blood collection container for holding a blood specimen to be separated and having an opening therein; and
 ii. a separating apparatus inserted in the opening of said container, having a diameter less than the width of said collection chamber so that said apparatus fits loosely within said collection container and does not form an interference fit with the inner walls of said container; said apparatus comprising: an elongate body defining a central bore which has an upper portion and a lower portion; said body having a first end which is open and communicates freely between the exterior and the upper portion of said bore and a second end which is open and communicates between the exterior and the lower portion of said bore;

a filter member located adjacent to said second end and being interposed between the body exterior and the lower portion of said bore, said filter member having pore sizes which permit the passage of soluble blood components but prevent passage of insoluble blood components; and said apparatus having a specific gravity of between 0.3–1.3.

2. An apparatus of claim 1 wherein said filter member is an open cell polyurethane foam.

3. An apparatus of claim 1 wherein said elongate body is a cylinder.

4. An apparatus of claim 1 wherein said filter member has pore sizes of about 50 microns.

5. An apparatus of claim 1 wherein said elongate body is collapsible.

6. An apparatus of claim 1 wherein said elongate body comprises an upper inflexible member, a lower inflexible member and an interposed foldable member joining said upper and lower members.

7. The assembly of claim 1 wherein the collection container is a tubular container having one open end and said apparatus elongate member has a diameter of about 2 to about 5 percent less than the diameter of said collection container.

8. A method of isolating the soluble components from the insoluble components of a blood mixture held in a blood collection container and which is selected from coagulated whole blood and mixtures of whole blood with anti-coagulants which consists of placing in said blood mixture an apparatus which comprises;

an elongate body defining a central bore which has an upper portion and a lower portion; said body having a first end which is open and communicates freely between the exterior and the upper portion of said bore and a second end which is open and communicates between the exterior and the lower portion of said bore;

a filter member located adjacent to said second end and being interposed between the body exterior and the lower portion of said bore, said filter member having pore sizes which permit the passage of soluble blood components but prevent passage of insoluble blood components;

said apparatus having a specific gravity of between about 0.3 and 1.3; said apparatus having a diameter which is less than the width of said collection container so that said apparatus is loosely disposed within said blood collection container when emplaced in said blood mixture and does not form an interference fit with the inner walls of said container; and centrifuging said blood mixture with said apparatus emplaced thereon.

9. A method according to claim 8 wherein said blood mixture is coagulated whole blood.

10. A method according to claim 8 wherein said blood mixture is a mixture of whole blood with anti-coagulants.

11. A method according to claim 8 wherein said elongate body is collapsible.

* * * * *